Dec. 27, 1949 C. SWENSON 2,492,900
ROLL FILM CUTTING CAMERA
Filed Oct. 9, 1945
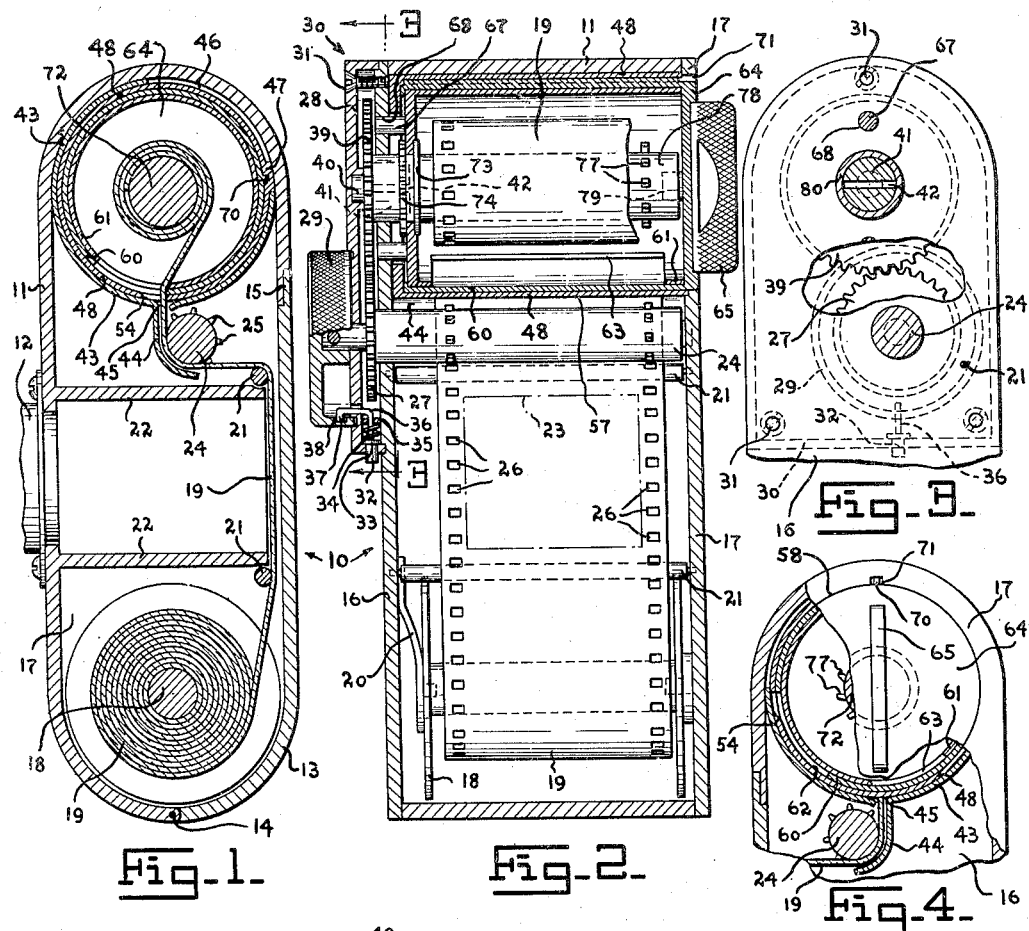
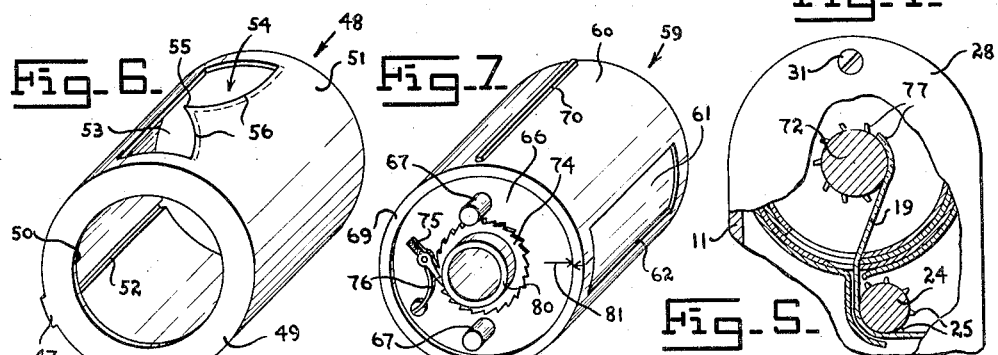
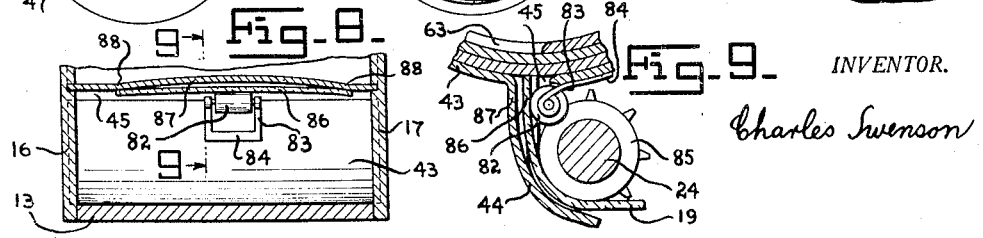
INVENTOR.
Charles Swenson Patented Dec. 27, 1949

2,492,900

UNITED STATES PATENT OFFICE 2,492,900

ROLL FILM CUTTING CAMERA

Charles Swenson, New York, N. Y.

Application October 9, 1945, Serial No. 621,219

6 Claims. (Cl. 242—71)

My invention relates to improvements in roll film cutting camera and particularly in cameras using perforated film such as for instance the popular miniature or candid cameras.

The first object of my invention is to provide means whereby an exposed part of the film may be readily removed from the camera in daylight without disturbing the film advance mechanism, and while retaining the film supply spool in the camera for continued and otherwise uninterrupted performance; another object is to provide means whereby rotation of the take-up spool and the winding of the film thereon under an even tension is accomplished by direct manipulation of the film advance sprocket, thereby lessening the stress on the film and making it possible to use a thinner and less expensive film, and in cooperation with the film cutting device in the present invention, to load the camera with a much increased supply of film; a further object is to provide a take-up spool container, in which exposed film may be readily removed from the camera and preserved in daylight outside the camera; a still further object is the provision of a device of this character, which is simple to construct, compact and yet easy and reliable in operation. Further objects and advantages of my invention will appear as the specification proceeds.

I attain these objects by the mechanism illustrated in the accompanying drawings, in which Fig. 1 is a sectional view of a camera embodying my invention and shows an exposed part of the film wound up on the take-up spool; Fig. 2 is a section perpendicular to that of Fig. 1 showing the film cut and the take-up spool container ready to be withdrawn from the camera; Fig. 3 is a section through the line 3—3 on Fig. 2 viewed in the direction of the arrows; Fig. 4 is a partly cut away end view in the opposite direction as that of Fig. 1 of the upper part of the camera; Fig. 5 is an end view in the same direction as that of Fig. 1 partly cut away to illustrate how the rotating take-up spool receives the advancing film; Fig. 6 is a perspective view of the film cutting knife removed from the camera; Fig. 7 is a perspective view of the take-up spool container outside the camera; Fig. 8 shows a modification in a horizontal section taken directly above the sprocket, looking upward; and Fig. 9 is an enlarged section through the line 9—9 on Fig. 8, viewed in the direction of the arrows.

Similar numerals refer to similar parts throughout the several views.

The camera generally designated 10 is formed substantially by a main front part 11 with a lens tube 12, a back cover 13, which is hinged at 14 to the front part and locked at 15 by a clasp or the like (not shown), and two end walls 16, 17. A supply spool 18 containing the film 19 is rotatably mounted in the lowermost part of the camera, the pressure spring 20 providing a suitable resistance to the unwinding of the film. As best shown in Fig. 1 the film 19 passes from the supply spool 18 upward, behind and in contact with two rollers 21 rotatably mounted in the end walls 16, 17, close to the lower and upper walls 22 of an exposure chamber, which is formed by a box like extension at the front part 11, and whose inner surfaces indicate the limits 23 of the exposure area. The film then moves forward, passing under and in front of a film transport sprocket 24, with teeth 25 engaging the marginal film perforations 26. A bearing is provided in the right end wall 17 for the sprocket, which passes through the left end wall 16, where directly outside it has keyed on a spur gear 27, a second bearing is provided in a plate 28, outside of which on its extreme left end, a knurled film advance knob 29 is attached as by means of a set screw. A gear housing 30, of which the plate 28 is a part, is attached outside the left end wall 16 of the camera by means of screws such as 31 and has in its lower end an opening for a push button 32, which is provided, inside the housing 30, with a collar 33, on which acts one end of a coil spring 34, the other end being supported against a flat piece 35, situated within the housing 30; from the centre of the button 32, inside the spring 34, extends a rod 36—being suitably bent—its extreme end 37 enters a notch 38 in the inner surface of the hollow film advance knob 29, preventing rotation of the latter. On pressing and again letting go of the button 32 the sprocket 24 may be rotated one complete turn—which corresponds to a one exposure advance of the film 19—until it automatically stops, when the latch 37 again enters the notch 38 urged by the spring 34.

In mesh with the gear 27 is a spur gear 39 keyed on a shaft 40, which is rotatably mounted in the plate 28 and whose right end 41 is split along a diameter at 42 and thus adapted to form a friction clutch with a take-up spool, which will be described later, by entering the hollow end thereof. The gears 27, 39 are in a proportion, so that the surface velocity transmitted to an empty take-up spool will be approximately equal to that of the film 19, and the necessary decrease in the angular velocity of the spool, relative to the shaft 40, with each turn of film accumulating on the spool, is provided for by slipping within the friction clutch described, and the film will be wound up on the spool under an even tension, which may be regulated by bending in or out the branches of the split end 41 of the shaft 40.

The uppermost part of the camera contains a lining 43, metallic or made of other suitable material, the ends of which may be imbedded in the camera walls 16, 17 to better preserve its accurate shape, which is circular in cross section and concentric with the shaft 40, a lower extension 44 is bent longitudinally down and about half way around the sprocket 24 to form a guide for the film 19 and an opening 45 for its passage within the lining. The lining 43 is also partially cut away at the top at 46 to provide room for the movement of about 90° of a longitudinal ridge 47 on the outer surface of a cylindrical film cutting knife 48, which may be made of thin steel or other suitable material, circular in cross section and fitting for rotation closely within the lining 43, so as to cover, when in a certain position, the film gate 45 in the latter in a light precluding manner. The knife 48 is shown separated from the camera in Fig. 6 having a relatively heavy end 49 with a central circular opening 50 and being open at the other end. The curved part 51 in the inner surface, within the angle subtended by the ridge 47, is provided with a longitudinal groove 52. The knife 48 is open for the passage of film at 53, and one side of the opening is fashioned into a cutting edge 54, which is pointed at the centre 55 and symmetrically curved toward the ends at 56 and designed on rotation to cut the film 19 transversely in a straight line at 57 directly above the film gate 45 in the lining 43. It may now be pointed out, that the distance measured on the film 19, from the upper limit 23 of the exposure area to the line of cutting 57, is exactly equal to the length of one exposure area.

The uppermost part of the right end wall 17 is provided with a circular opening 58, centered by the shaft 40 and of a diameter equal to the inner surface of the knife 48, for the insertion of a take-up spool container 59, which fits snugly within the knife and consists of an outer cylinder 60 and an inner cylinder 61 of thin material, fitting closely for rotation one outside the other, each with an opening 62, 63 for the passage of the film 19, said openings being aligned with the opening 53 in the knife 48, when the container is open in the camera, and rotated away from one another, to close the container to the entrance of light, before its removal. Each cylinder has a relatively heavy closed end and is open at the other end, the closed end 64 of the outer member 60 is aligned with the camera wall 17, when the container is in place in the camera and provided with a handle 65, whereby it may be rotated, and that portion 66 of the inner member 61 has two pins 67 entering corresponding holes 68 in the opposite camera wall 16 to hold it against rotation. The open end of the outer member 60 is bent at 69 toward the centre over the end portion 66 of the inner member 61, or a flat ring or flange may be soldered on, so as to have the take-up spool container in one single unit. A key 70 extends parallel to the axis on the outer curved surface of the outer cylinder 60 to slidingly fit the groove 52 in the knife 48, whereby the two parts 60, 48 will rotate together on manipulation of the handle 65. It may be pointed out, that the outer cylinder 60 is so adjusted within the knife 48, that closing of the container 59 begins immediately after the film cutting is completed. A key way 71 in the upper part of the opening 58 in the camera wall 17 is aligned with the groove 52 in the knife 48, when the container 59 is outside the camera for the insertion of the key 70, which also serves the purpose of locking the container in the camera. A take-up spool 72 is mounted for rotation centrally in the end portion 66 of the inner container member 61 by means of a collar 73 and a ratchet wheel 74, which are fixed on the spool closely on either side of said end portion 66 in a light precluding manner, as best shown in Fig. 2. The fine toothed ratchet wheel 74, being outside the end 66, is acted on by a pawl 75 and a leaf spring 76 mounted in said end portion to permit rotation of the spool 72 in one direction only. The spool is provided with teeth 77 to engage the marginal film perforations 26, and said teeth are bent somewhat in the direction of the rotation to better catch and hold the advancing film, as shown in Fig. 5. The right spool end 78 is entered by and adapted to rotate about a pin 79, which is projecting inward from the centre of the right end 64 of the container 59, and the left end 80 of the spool 72 is hollowed or otherwise provided with a tube to enclose the split end 41 of the shaft 40 and form a friction clutch therewith as previously mentioned. The take-up spool container 59 is provided with alignable arrow marks 81 to aid in its proper closing, before it is placed in the camera.

In the modification shown in Figs. 8 and 9 I provide a roller 82 rotatably mounted directly below the film gate 45 in the free end of a light leaf spring 83, the other end of which is fastened at 84 to the central lower part of the lining 43. The roller 82 traces the central back of the film 19 and is normally pushed back and down into a peripheral groove 85 provided therefor in the sprocket 24. When the film is cut, the roller 82, urged by the spring 83, pushes the centre of the free cut off end 86 of the film 19 forward, toward the film guide 44, the upper central part 87 of which is given a transverse curvature, so as not to touch the film coating, while the edges 88 thereof maintain gliding contact with the film edges. The purpose of the modification is to curve the film end 86 slightly transversely, thereby increasing its stability, as it passes upward from the film gate 45 to the take-up spool 72 unsupported.

In loading the camera it is best to cut the film end perpendicularly, so that opposite marginal perforations will be engaged at once by the lower sprocket teeth, and making sure that the film moves straight; thereafter the camera may be closed and need not be opened except for reloading.

In the film cutting operation the handle 65 is turned about 90° until it stops, thereby cutting the film and closing camera and take-up spool container, which may now be removed, as the key 70 has moved into alignment with the keyway 71 in the camera wall 17. Emptied of film and closed properly by aligning the arrow marks 81, the container is replaced in the camera, which is again ready for operation, as soon as the handle 65 is turned back, and film may again be cut and removed after one or more turns of the film advance knob 29.

While I have shown only a preferred form of my invention, it should be understood, that various changes and modifications may be made within the scope of the claims hereto attached without departing from the spirit of the invention.

I claim:

1. A roll film camera using cinematographic film strips, comprising a casing, a supply spool therein, a take up spool for the film, a take up spool container consisting of two concentric cylinders, each provided with a film admission opening, means for moving said concentric cylinders relatively to each other adapted to align the openings in one position, while covering the opening of one cylinder completely by the wall of the other cylinder in the second position, a movable cylindrical cutting knife, tightly encircling the outer cylinder and guided thereon, means for coupling the said outer cylinder with the cylindrical cutting knife, said means moving the knife automatically when the cylinders are moved relatively in order to align or cover the two cuts.

2. A roll film camera using cinematographic film strips, comprising a casing, a supply spool for film therein, a take up spool for the film, a removable take up spool container consisting of two concentric cylinders in touch with each other, each provided with a film admission opening, means for moving the concentric cylinders angularly around their common axis, a cylindrical knife tightly surrounding the outer cylinder of the take up spool container, adapted to be moved angularly around the axis of the spool container, mounted within the camera, means to couple said take up spool container with said knife when the container has been inserted into the camera, and a cylindrical lining fixed within the camera and tightly encircling and guiding the cylindrical knife, provided with a slot acting as a film gate.

3. A roll film camera using cinematographic film strips, comprising a casing, a supply spool for film therein, a take up spool for the film, a removable take up spool container, consisting of two concentric cylindrical members in contact with each other, each provided with a film admission opening, means for angularly displacing the cylinders relatively to each other, so as to align the openings in one position and to cover them by cylinder walls in the other position, thus closing the container, a cylindrical cutting member tightly surrounding the outer cylindrical member of the take up spool container, angularly movable around the same, but fixedly mounted in an axial direction, means to couple the outer cylindrical member of the take up spool container with the cylindrical cutting member, a stationary cylindrical lining within said casing tightly surrounding said cutting member, a slot within said lining forming a film gate, a transport and guiding roller in front of said film gate, and means for coupling said transport and guiding roller with said take up spool.

4. In a roll film camera using cinematographic film strips as claimed in claim 3, a transport and guiding roller provided with an axle projecting through the camera casing, a stub shaft axially aligned with the axis of the take up spool, gear wheels connecting said stub shaft and said axle, a friction coupling between said stub shaft and the take up spool within the container and means for moving the take up spool and the transport and guide roller in complete unison.

5. A roll film camera using cinematographic film strips, comprising a casing, a supply spool for film therein, a take up spool for the film, a removable take up spool container, consisting of two concentric cylindrical members in contact with each other, each provided with a film admission opening, means for angularly displacing the cylinders relatively to each other, so as to align the openings in one position and to cover them by cylinder walls in the other position, thus closing the container, a cylindrical cutting member tightly surrounding the outer cylindrical member of the take up spool container, angularly movable around the same, but fixedly mounted in an axial direction, and provided with an opening and a cutting edge, and further provided with a groove, a ledge adapted to engage said groove arranged on the outer cylindrical members of the take up spool container, the engagement of said ledge and groove coupling the above mentioned members, a stationary cylindrical lining within said casing tightly surrounding said cutting means, and provided with a slot forming a film gate, a guide member radially projecting from said lining near said slot, the angular position of the cylindrical cutting member with respect to the outer member of the container and the lining being so chosen that the cutting member opening is aligned with the film gate and with the openings of the cylindrical members of the container in one position, while said cutting member is moved across the film gate upon closing of the take up spool container.

6. A roll film camera using cinematographic film strips as claimed in claim 3 wherein the cylindrical lining carries a small supporting roller near the film gate, pressing upon the central portion of the film strip between the transport roller and the film gate.

CHARLES SWENSON.

REFERENCES CITED

The following references are of record in the file of this patent:

UNITED STATES PATENTS

| Number | Name | Date |
| --- | --- | --- |
| 1,424,816 | Grillone | Aug. 8, 1922 |
| 1,680,647 | Stark et al. | Aug. 14, 1928 |
| 1,707,980 | Guerin | Apr. 9, 1929 |
| 1,764,450 | Hindle | June 17, 1930 |
| 1,955,300 | Kurnick | Apr. 17, 1934 |
| 2,095,849 | Wittel | Oct. 12, 1937 |
| 2,225,433 | Goldberg | Dec. 17, 1940 |
| 2,298,574 | Lockhart | Oct. 13, 1942 |